(12) United States Patent
Schulz et al.

(10) Patent No.: US 8,597,789 B2
(45) Date of Patent: Dec. 3, 2013

(54) MICROSTRUCTURED MULTIFUNCTIONAL INORGANIC COATING ADDITIVES FOR PREVENTING FOULING (GROWTH OF BIOFILM) IN AQUATIC APPLICATIONS

(75) Inventors: Katharina Schulz, Freigericht (DE); Rüdiger Mertsch, Wiesbaden (DE); Jürgen Meyer, Stockstadt (DE); Günther Michael, Karlstein (DE); Matthias Rochnia, Ortenberg-Bleichenbach (DE); Thorsten Schultz, Hassenroth (DE); Juri Tschernjaew, Aschaffenburg (DE)

(73) Assignee: Evonik Degussa GmbH, Essen (DE)

( * ) Notice: Subject to any disclaimer, the term of this patent is extended or adjusted under 35 U.S.C. 154(b) by 435 days.

(21) Appl. No.: 12/850,775

(22) Filed: Aug. 5, 2010

(65) Prior Publication Data

US 2011/0030578 A1    Feb. 10, 2011

(30) Foreign Application Priority Data

Aug. 5, 2009    (DE) .......................... 10 2009 028 255

(51) Int. Cl.
*B32B 5/16* (2006.01)
*B05D 1/18* (2006.01)
*B05D 7/00* (2006.01)

(52) U.S. Cl.
USPC ................ 428/402.24; 428/306.6; 428/307.3; 428/403; 428/404; 427/430.1; 427/443.2

(58) Field of Classification Search
USPC .............. 428/402.24, 403, 404, 306.6, 307.3; 427/430.1, 443.2
See application file for complete search history.

(56) References Cited

U.S. PATENT DOCUMENTS

| 4,011,898 | A | * | 3/1977 | Hubbard ....................... 150/107 |
| 4,053,851 | A | | 10/1977 | Krupke |
| 4,065,564 | A | | 12/1977 | Miles et al. |
| 4,073,880 | A | | 2/1978 | Pader et al. |
| 4,115,130 | A | | 9/1978 | Crump et al. |
| 4,278,655 | A | | 7/1981 | Elmi |
| 4,414,005 | A | | 11/1983 | Bievre et al. |

(Continued)

FOREIGN PATENT DOCUMENTS

| CA | 2438438 | 2/2005 |
| CH | 573212 | 3/1976 |

(Continued)

OTHER PUBLICATIONS

Park, D.J. et al., "Controlled Release of Pesticides from Microparticles," Controlled-release Delivery Systems for Pesticides (H.B. Scher, editor), Marcel Dekker Inc., New York (1999) 89-136.

(Continued)

*Primary Examiner* — Hoa (Holly) Le
(74) *Attorney, Agent, or Firm* — Michael Best & Friedrich LLP (57) ABSTRACT

The present invention relates to innovative antifouling additives, to a process for producing them, to coating systems comprising the antifouling systems of the invention, to a process for producing the coating systems, and to the use of the antifouling additives and coating systems of the invention for preventing the underwater fouling of surfaces of objects which are in contact or come into contact with water.

24 Claims, 3 Drawing Sheets

XPS overview spectrum of Sipernat® 50 charged with 20% by weight 2-Mi, produced by the process of the invention

(56) References Cited

U.S. PATENT DOCUMENTS

| | | | |
|---|---|---|---|
| 4,938,955 A * | 7/1990 | Niira et al. | 424/78.1 |
| 5,084,440 A | 1/1992 | Baudin et al. | |
| 5,500,138 A | 3/1996 | Bacon et al. | |
| 5,776,240 A * | 7/1998 | Deller et al. | 106/482 |
| 6,294,505 B1 * | 9/2001 | Luers et al. | 508/136 |
| 6,905,698 B1 * | 6/2005 | Aldcroft et al. | 424/405 |
| 2001/0026802 A1 | 10/2001 | Price et al. | |
| 2002/0103219 A1 * | 8/2002 | Jacob | 514/291 |
| 2004/0047792 A1 * | 3/2004 | Schubert et al. | 423/335 |
| 2004/0142170 A1 * | 7/2004 | Prabhu et al. | 428/398 |
| 2007/0036843 A1 | 2/2007 | Hirsh et al. | |
| 2008/0058459 A1 * | 3/2008 | Brand et al. | 524/493 |
| 2010/0026802 A1 | 2/2010 | Titus et al. | |
| 2011/0030578 A1 | 2/2011 | Schulz et al. | |
| 2011/0033511 A1 | 2/2011 | Pisula et al. | |
| 2011/0037021 A1 | 2/2011 | Tschernjaew et al. | |

FOREIGN PATENT DOCUMENTS

| | | |
|---|---|---|
| DE | 102008000290 | 8/2009 |
| DE | 102009028255 | 2/2011 |
| DE | 102009036767 | 2/2011 |
| EP | 0005302 | 11/1979 |
| EP | 0170386 | 12/1983 |
| EP | 0454881 | 11/1991 |
| EP | 0341383 | 6/1992 |
| EP | 0798348 | 12/1998 |
| EP | 0725037 | 3/2001 |
| EP | 1241135 | 9/2002 |
| EP | 0922671 | 10/2003 |
| EP | 1398301 | 9/2007 |
| GB | 2018590 | 7/1982 |
| WO | 97/29157 | 8/1997 |
| WO | 00/11949 | 3/2000 |
| WO | 00/51724 | 9/2000 |
| WO | 01/58416 | 8/2001 |
| WO | 02/098998 | 12/2002 |
| WO | 03/033027 | 4/2003 |
| WO | 03/082360 | 10/2003 |
| WO | 2004/072153 | 8/2004 |
| WO | 2005/012175 | 2/2005 |
| WO | 2006/004481 | 1/2006 |
| WO | 2006/111761 | 10/2006 |
| WO | 2007/024265 | 3/2007 |
| WO | 2007/030389 | 3/2007 |
| WO | 2007/048464 | 5/2007 |
| WO | 2008/013757 | 1/2008 |
| WO | 2008/025538 | 3/2008 |
| WO | 2009/100995 | 8/2009 |

OTHER PUBLICATIONS

European Search Report for Application No. 10170359 dated Oct. 14, 2010 (6 pages).
International Preliminary Report on Patentability for Application No. PCT/EP2009/051137 dated Sep. 10, 2010 (9 pages).
Translation of International Preliminary Report on Patentability for Application No. PCT/EP2009/051137 dated Dec. 9, 2010 (10 pages).
International Search Report for Application No. PCT/EP2009/051137 dated Aug. 10, 2010 (5 pages).
United States Patent Office Action for U.S. Appl. No. 12/851,623 dated Feb. 14, 2013 (13 pages).

* cited by examiner

Figure 1: Principle of X-ray photoelectron spectrometry XPS/ESCA

Figure 2: XPS/ESCA spectrum for trifluoroacetic acid

Figure 3:
XPS overview spectrum of Sipernat® 50 charged with 20% by weight 2-Mi, produced by the process of the invention

MICROSTRUCTURED MULTIFUNCTIONAL INORGANIC COATING ADDITIVES FOR PREVENTING FOULING (GROWTH OF BIOFILM) IN AQUATIC APPLICATIONS

CROSS-REFERENCE TO RELATED APPLICATIONS

This patent application claims priority to German Patent Application No. 102009028255.6, filed Aug. 5, 2009, the disclosure of which is incorporated by reference herein in its entirety.

INTRODUCTION

The present invention relates to innovative antifouling additives, to a process for producing them, to coating systems comprising the antifouling systems of the invention, to a process for producing the coating systems, and to the use of the antifouling additives and coating systems of the invention for preventing the underwater fouling of surfaces of objects which are in contact or come into contact with water.

The organic underwater fouling of ships' hulls, water traffic markings, offshore platforms and all other objects deployed in fresh water or sea water has for a very long time represented a considerable disruption and not least a cost factor. This biofouling, as it is known, often consists initially of a bacterial biofilm, and this film is soon overgrown by macrofoulers such as, for example, algae, barnacles and mussels. Unprotected boat hulls are covered completely by the fouling within a few months, and this may increase their frictional resistance by up to 25%. The economic cost which arises is immense. Given the enormous volume of traffic represented by the world's commercial fleet on an annual basis, biofouling gives rise to additional fuel costs amounting to several billion US$. Accordingly, a wide variety of different strategies are employed to prevent this fouling or at least to greatly reduce it. These strategies can be classed essentially into three categories: physical, chemical, and biological methods. The physical methods include, among others, the sub-class of complicated electrical defence methods to prevent fouling. Particular mention may also be made of the modification of the surface by texturing, in accordance, for example, with the pattern shark skin (WO 2008/025538 A1), or functionalization of the surface by fluoropolymers, by silicone compounds, or by the use of modified hydrophobic silica (WO 97/29157). Biological methods, which at the present point in time are comparatively expensive, use enzymes and bacteria for defence against fouling organisms. The most powerful methods have for decades been the chemical methods, i.e. the use of non-specific, broad-spectrum toxins, which are added to the coatings in the underwater region. The most well-known of the active antifouling ingredients is the organotin compound tributyltin (TBT). TBT was formerly considered to be the compound having the highest activity against fouling. However, it has been shown to accumulate in marine biotopes and sediments, and, on account of its non-specific, broad-spectrum action, it has considerable effects on marine flora and fauna. The environmental damage this causes, and the massive economic damage, as for instance within commercially exploited oyster beds, led in 2003 to a ban on TBT-containing coatings, through a resolution by the International Maritime Organization (IMO). There also exist copper-based coatings which, like TBT, are applied in the form of a polymeric matrix to underwater bodies. This is often done in combination with additives which boost the antifouling effect. For this reason they are also dubbed "booster biocides". The action of copper is less toxic than that of TBT, and therefore considerably higher concentrations of active ingredient are necessary in order to obtain comparable antifouling results. The detection of the harmful side effects of TBT on marine fauna initiated the development of more environmentally compatible alternatives. Among these, the most important representatives from the organic biocides sector include Irgarol® 1051, Sea-Nine™ 211 or else zinc pyrithione. In spite of their improved compatibility, these substances too have an adverse effect on the ecosystem and in some cases are not entirely biodegradable.

The development of environment-friendly, biodegradable, active antifouling ingredients is therefore a current focus of research. In addition to the innumerable number of chemical additives, studies are also being carried out on biocidal effects of red and brown algae, as natural active antifouling ingredients, but these are not being exploited commercially.

DETAILED DESCRIPTION

It was an object of the present invention, therefore, to provide new antifouling additives for coating systems for protecting articles which are in contact or which come into contact with water, especially sea water, but which do not have the disadvantages set out above for the additives of the prior art, or have them only to a reduced extent.

One specific objective of the present invention was to provide antifouling additives which are largely or completely biodegradable and/or biologically unobjectionable.

Another specific object was to provide antifouling additives which ensure adequate antifouling protection to watercraft, both during their voyages and when they are laid up, or to other objects which are in contact or which come into contact with water, especially sea water.

It was also an object of the invention to provide a process for producing the antifouling additives of the invention.

Finally, it was an object of the present invention to provide coating systems for protecting objects which are in contact or which come into contact with water, especially sea water, that do not have the disadvantages set out above for the additives of the prior art, or only to a reduced extent.

Further objects, not explicitly stated, will become apparent from the overall context of the description, examples and claims below.

The inventors have, surprisingly, found that antifouling additives comprising at least one inorganic and/or organic porous carrier and at least one active antifouling ingredient which is incorporated in the porous carrier in such a way that a large part of the outermost surface of the product system is formed by the carrier material are outstandingly suitable for achieving the stated object. By virtue of their construction, the antifouling additives of the invention have the advantage that they are very stable mechanically. Furthermore, by controlling the pore structure of the carrier and also by selecting the active ingredient, it is possible to regulate the diffusion-controlled release of the active ingredient over a relatively long time.

In one particularly preferred embodiment the additives of the invention have the advantage that they can be incorporated to outstanding effect into surface-coating-material systems. The inventors have in fact found that, when a carrier material is selected which has been developed as an adjuvant for surface-coating-material formulations and has been optimized for that purpose, such as matting agents of amorphous $SiO_2$, for example, the additives of the invention can be incorporated particularly well into surface-coating materials. Without being tied to any particular theory, the inventors are of the view that, because of the fact that the active ingredient is present largely or exclusively in the pores of the carrier, and a large part of the outer surface of the additive continues to be formed by the carrier material, the incorporation properties are such as if there were no active ingredient present in the carrier. This can be explained by stating that there are essentially only interactions between surface-coating material and carrier material. A side effect of using the carrier-supported silica particles, moreover, is a reduced binder consumption, since the pores are already filled with the active substances.

The inventors have found, furthermore, that the long-term activity of the antifouling additives of the invention can be improved still further if, in addition to the active ingredient, there is also a protection substance incorporated into the pores of the carrier material, thereby allowing the release of the active ingredient to be controlled even more effectively.

The coating systems of the invention have the great advantage that activity of at least 1 year in the sports boat sector and at of least 5 years in commercial shipping can be ensured, with an optimum antifouling protection ensured both during voyage and during lay-up.

Another feature of the antifouling additives of the invention is that they represent a universal, easy-to-use, cost-effective, environment-friendly and biodegradable achievement of the stated object. As a result, the antifouling additives of the invention make it possible to produce coating systems which, in comparison with known antifouling systems based on environmentally hazardous biocides and metal compounds, achieve at least the same efficiency of action, but also, furthermore, are environment-friendly and at least partly biodegradable.

The present specification accordingly provides antifouling additives comprising at least one inorganic and/or organic porous carrier and at least one active ingredient incorporated into the porous carrier, and characterized in that, as demonstrated by XPS analysis of the outermost atomic layer of the product system, at least part of the outermost surface of the product system is formed by the carrier material.

The present specification further provides antifouling additives which are characterized in that in addition to the active substance and the carrier material they comprise at least one further substance (envelope substance), of which at least part of the total amount present in the product system is incorporated into the pores of the carrier material.

Likewise provided by the present invention is a process for producing the additives of the invention, characterized in that at least one porous, preferably inorganic, solid is contacted with at least one active antifouling ingredient in such a way that the active ingredient is drawn into the pores of the solid.

Further provided by the present invention is a coating system, more particularly for objects which are in contact or which come into contact with water, especially sea water, that comprises the additive of the invention.

Further provided by the present invention is a method of protecting the surface of objects which are in contact or which come into contact with water, especially sea water, characterized in that the coating system of the invention is applied to the surface of the objects.

Finally, the present invention provides for the use of the antifouling additives of the invention or of the coating systems of the invention for protecting the surface of objects which are in contact or which come into contact with water, especially sea water, against fouling.

The subject matter of the present invention will be described in detail below.

Antifouling additives for the purposes of the present invention refer to an absorbate comprising a porous, water-insoluble carrier material, preferably an inorganic carrier, and at least one active ingredient.

The terms active antifouling ingredient and active ingredient are used synonymously in the context of the present invention. For the purposes of the present invention, the terms refer to active biocidal and/or active antifouling substances, i.e. chemical compounds which are capable of retarding, halting or preventing unwanted surface colonization by animals, including microorganisms, and plants on objects which are in contact with water, especially sea water.

Biological degradability or biodegradable for the purposes of the present invention refers to the ability of organic chemicals to degrade biologically, in other words to be decomposed by life forms or by their enzymes. Ideally, this chemical metabolism proceeds completely until mineralization takes place, and so the organic compound can be broken down into inorganic substances such as carbon dioxide, oxygen and ammonia. In analytical terms, this operation may be detected, for example, by stating the half-life.

If full biological degradation in the sense of the above definition is not possible, then it is ensured that the active ingredients used for the purposes of the invention are biologically unobjectionable. In other words, the active compounds have a selective action on the fouling organisms and have little or no toxic or hazardous influence on other organisms. The active ingredients exhibit little or no accumulation in water, and pose little or no environmental hazard.

Environmentally hazardous for the purposes of the present invention are those compounds and compositions which are able, directly or indirectly, to cause long-term irreversible alteration or harm to humans, animals, plants, their habitats and living spaces, and also, in particular, to the soil.

A feature of the antifouling additives of the invention is that, as a result of the use of microstructured particles as a carrier system, the active ingredient must first be dissolved by diffusion out of the pores of the carrier material. As a result, a slow, long-lasting release of the active ingredient is obtained after the object treated with the antifouling additives of the invention has been exposed to water. The active ingredients released efficiently prevent the colonization by marine organisms of the surface of the object treated with the antifouling additives of the invention. The rate at which the active ingredient is released and the time period over which release takes place can be controlled through the specific selection of the particle size and/or pore structure of the carrier particles. Uniform release of active ingredient, particularly at the interface between coating and surroundings, is likewise possible.

In one special, preferred embodiment of the present invention the active ingredient is present exclusively in the pores of the carrier particles. Release of the active ingredient takes place not until after contact with water. In other words, the release mechanism is controlled via the water solubility. In this way it is possible to prevent unwanted harm to humans, animals and plants in the course of the production, transport and processing of the antifouling additives of the invention.

Conversely, the particles protect the active ingredient from premature decomposition and deactivation.

In another special, preferred embodiment of the present invention, the antifouling additives of the invention comprise, in addition to the carrier material and at least one active ingredient, an envelope substance which even more effectively prevents the unwanted extraction of the active ingredient, thereby allowing unwanted harm to humans, animals and plants to be prevented even more effectively. This envelope substance seals the pores, and so contact of the active ingredient with the water is possible only after dissolution of the protection substance or after diffusion of the active ingredient through the protection substance. The envelope substance therefore allows premature decomposition and deactivation of the active ingredients to be prevented even more effectively.

Irrespective of whether the antifouling additives of the invention have or do not have a protection substance, they include the feature that at least part of the outermost surface of the product system is formed by the carrier material. Preferably at least 10%, more preferably at least 15%, very preferably at least 20% of the outer surface of the additives of the invention, according to XPS measurement of the outermost atomic layer, is formed by the carrier material, or not formed by the molecules of active ingredient/ingredients and/or protection substance/substances.

For specific applications it is advantageous, moreover, for the outer surface of the product systems of the invention to be free from active ingredient(s), so that these active ingredient fractions do not initiate a premature unwanted reaction and do not exert any unwanted harmful effect on humans, animals or plants. In one particular embodiment of the present invention there is no active ingredient on the outer surface of the product systems of the invention, according to XPS measurement of the outermost atomic layer, or not more than 10%, preferably not more than 5%, more preferably not more than 1% of the outer surface is covered by active ingredient.

As carrier material for the purposes of the present invention it is possible in principle to use any porous solid which is not soluble in water. Preference is given to using porous inorganic solids, more particularly porous $SiO_2$, more preferably amorphous $SiO_2$, very preferably precipitated silica, fumed silicas, silicas prepared on the basis of fumed silica, silica gels, a silicate or hybrid forms thereof. Especially preferred are precipitated silicas according to EP 1398301 A2 or EP 1241135 A1 or EP 1648824 A1 or EP 0798348 A1 or EP 0341383 A1 or EP 0922671 A1. The subject matter of said applications is hereby incorporated explicitly into the present specification.

Likewise with preference it is possible to use specially spray-dried granules of pyrogenic metal oxides or transition metal oxides. Very particular preference is given to those sold under the brand name AEROPERL® by Evonik Degussa, with AEROPERL® 300/30 being especially preferred. The preparation of such AEROPERL® products from fumed silicon dioxide is described in EP0725037, the content of which is hereby adopted explicitly into the description of the present invention.

Amorphous silicon dioxides, preferably precipitated or fumed silicas and silica gels, are already used on a standard basis as additives (e.g. for rheology control or matting) in coating materials, and so, independently of the active ingredients employed, easy incorporation and uniform distribution of the antifouling-carrier composites in the coating material can be ensured. The use of these carrier materials affords a great advantage in particular because these carrier materials are already used as additives in coating systems, especially surface-coating materials, and can therefore be incorporated into coating systems, preferably surface-coated formulations, without any need for reformulation of the recipe of the coating system. Moreover, for the end user, the use of the newly developed product does not entail any additional cost.

Porous carrier materials of amorphous $SiO_2$ have the advantage, finally, that they are environment-friendly and biologically unobjectionable—that is, they are harmless to humans, animals and plants. For example, precipitated silicas are used as carrier materials for vitamins in the animal nutrition sector.

Particularly preferred inorganic carrier materials, especially amorphous silicon dioxides, are notable, in the context of the present invention, for having an average particle size $d_{50}$ of 4 to 70 µm, preferably 4 to 50 µm, more preferably 4 to 20 µm, very preferably 4 to 15 µm, especially preferably 5 to 13 µm, and very especially preferably 6 to 12 µm. As already set out above, these carrier materials, which tend to be small, have various advantages, such as high absorption rate and good release properties, for example, owing to the good pore length, and also ready dispersibility in the antifouling coating compositions.

It has been found that, with regard to the surface texturing of the antifouling coatings, i.e. the production of a coating which is repellent to fouling organisms, it can be advantageous for at least some of the antifouling additives to have a carrier material having a relatively large average diameter. In this case the carrier materials used in accordance with the invention, especially in the case of silicon dioxide carrier materials, preferably have an average particle size $d_{50}$ of 20 to 180 µm, more preferably 50 to 150 µm, very preferably 70 to 130 µm.

In the case of Aeroperls as carrier material, average particle sizes $d_{50}$ of 4 to 70 µm are preferred, with 5 to 50 µm being particularly preferred and 6 to 40 µm being especially preferred.

From the foregoing it is evident that the present invention encompasses not only coating systems which comprise only antifouling additives having a small-average-diameter carrier material, but also those which comprise only antifouling additives having a very large average diameter. Also encompassed, however, are those coating systems which comprise both kinds of antifouling additives together. Particularly preferred coating systems comprise both kinds of antifouling additives, and other particularly preferred coating systems comprise only antifouling additives featuring a small-average-diameter carrier material.

Besides the average diameter, the carrier materials used in accordance with the invention, more particularly the amorphous silicon dioxides, may have a grindometer value of 18 to 45 µm, preferably 20 to 43 µm (in the case of correspondingly small average diameters) and/or a tapped density of 50 to 350 g/l, preferably 50 to 300 g/l, and/or an oil number of 180 to 360 g/100 g and/or a DBP number of 200 to 450 g/100 g, preferably 320 to 400 g/100 g, and/or a BET of 100 to 600 $m^2/g$, preferably 200 to 550 $m^2/g$, more preferably 300 to 550 $m^2/g$ and very preferably 350 to 500 $m^2/g$, and/or a total pore volume of 6 to 14 ml/g (0.0042-414 MPa, 140°). With very particular preference the carrier materials have a plurality of the aforementioned physicochemical properties in combination, and with special preference they have all of the above-stated properties in combination.

Hence the average particle size ensures, among other things, that the length of the pores from the core of the particle to its surface does not become too long or too short. This affects, among other things, the absorption rates and desorption rates of the active ingredient and of the protection substance. Within this size range, furthermore, effective processing and dispersing within the surface-coating formulation is ensured.

Depending on the concentration, the average diameter of the carrier material, and the surface-coating system, grindometer values (DIN EN 21524) are situated, as stated above, in the range from 18 μm to more than 100 μm. This means that, by incorporating the microstructured particles into the coating formulation, it is possible, on the surfaces coated with these coating formulations, to generate a microstructuring which influences biofilm growth.

The oil number and/or the DBP in the stated ranges ensures that a sufficient quantity of active ingredient and/or protection substance can be taken up into the particles. Since the active ingredient is to be taken up into the pores of the particles, a corresponding volume must be present in the pores of the particles. This is expressed by the total pore volume, which is measured by means of mercury porosimetry. The BET surface area, lastly, is important in order to be able to achieve sufficient reinforcement in the surface-coating system.

Active ingredients which can be used are all biocidal and/or antifouling-active substances that are approved for use in the freshwater and salt water sectors. With particular preference they are biodegradable substances or substances which pose little or no hazard to the environment, and with very particular preference are substances which are biodegradable and which pose little or no hazard to the environment. Very particular preference is given to them being non-environmentally hazardous substances, and with more particular preference they are natural oils, plant extracts and synthetic analogues thereof.

Active substances which can be used include the following active antimicrobial ingredients:

Organic acids (sorbic acid, propionic acid, acetic acid, lactic acid, citric acid, malic acid, benzoic acid) and their salts, PHB esters and their salts, sodium sulphite and corresponding salts, nisin, natamycin, formic acid, hexamethylenetetramine, sodium tetraborate, lysozyme, alcohols, organic halogen compounds, parabens (methyl, ethyl, propyl, butyl, isobutyl and propyl paraben), isothiazolones (benzisothiazolone, methylisothiazolone, octylisothiazolone), phenols, salicylates, nitriles, fragrances, flavours, and other active plant or synthetic ingredients with antimicrobial activity, and also metal salts, such as zinc oxide, zinc pyrithione and zinc alginate, for example.

As biodegradable active ingredients which pose little or no hazard to the environment it is possible more particularly to use the following:

Active plant ingredients such as, for example, menthol, peppermint oil, geraniol, limonene, citronellol, nerol, farnesol, tea tree oil, cinnamic acid, lemon grass oil, capsaicin, tannic acid, eelgrass acid (zosteric acid), *Helichrysum italicum* (flavonoids); *Corydalis pallida* (protoberin alkaloids); *Shiraia bambusicola* (perylenequinones); *Fraxinum omus* (hydroxycoumarins); *Podocarpus nagi* (totarol and nortiterpene dilactones); *Heterotheca inuloides* (sesquiterpenoids); *Pelargonium* spp. (essential oils); *Piper sarmentosum* (phenylpropanoids); *Allium* spp. (extracts); *Juniperus procera* (diterpenes); *Achillea conferta* (flavonoids, flavones, sesquiterpene lactones); *Magnolia virginiana* (lignans, neolignans); *Eucalyptus euglobal* (euglobal); *Armillaria mellea* (armillaric acid); *Dracena mannii* (spirostanol saponin); *Piper aduncum* (chromenes, prenylated benzoic acid); *Rhamnaceae* spp. (cyclopeptide alkaloids); *Buddleja globosa* (verbascoside); *Cephalocereus senilis* (phytoalexin aurones); *Salvia albocaerulea* (diterpenes); *Gomphrena martiana* and *Gomphrena boliviana* (extracts); *Paepalanthus* spp. (vioxanthin); *Helichrysum stoechas* and *Helichrysum crispum* (extracts); *Achillea ptarmica* (trans-pinocarveyl hydroperoxides); *Dehaasia incrassata* (alkaloids); Asteraceae spp. (extracts); *Arctotis auriculate* (extracts); *Eriocephalus africanus* (extracts); *Felicia erigeroides* (extracts); *Hemerocallis fulva* (phytosterols, fatty acid esters); *Psoralea juncea* (plicatin B); *Pluchea symphytifolia* (caffeic esters); *Tovomitopsis psychotrifolia* (vitamin E derivatives); *Celosia argentea* (triterpenoid saponins and flavonoids); *Azadirachta indica* (triterpenoid, mahmoodin, protolimonoid, naheedin); *Moraceae* spp. (coumarins); *Hypericum erectum* (phloroglucinol derivatives); *Podospora appendiculate* (appenolides A, B & C, furanones); *Artemisia princeps* var. *orientalis, Artemisia capillaris, Artemisia mexicana* and *Artemisia scoparia* (extracts); crushed malt (mash extract), *Kigelia pinnata* (extracts); *Acalypha wilkesiana* (extracts); seaweed, sea grass and lemon grass (oil essences; *Borreria latifolia, Borreria setidens, Hedyotis diffusa, Hedyotis nudicaulis, Morinda elliptica, Morinda umbellata, Sida rhombifolia*, and *Vitex ovata* (as extract); *Tabebuia impetiginosa, Achyrocline* spp., *Larrea divaricata, Rosa borboniana, Punica granatum, Psidium guineense, Lithrea ternifolia* (as extract); *Lepechinia caulescens, Lepidium virginicum* and *Tanacetum parthenium* (each extracts); *Talaromyces flavus* (extract); *Daucus carota* (extract); *Flabellia petiolata, Caulerpa prolifera, Halimeda tuna, Corallina elongata, Lithophyllum lichenoides, Phyllophora crispa, Cystoseira* spp., *Halopteris* spp., *Codium* spp., *Valonia utricularis, Posidonia oceanica, Zostera noltii* and *Cymodocea nodosa* (extracts); *Centauraea orientalis, Diospyros khaki, Sida hermaphrodita, Forsythia intermedia, Scutellaria polydon, Eugenia malaccensis* and *Eugenia jambolana* (extracts); *Fritillaria* L. spp. (ebeinone, steroidal alkaloids); *Kigelia pinnata, Peperomia pellucida, Populus nigra, Populus balsamifera* and *Populus deltoides* (extracts); *Melaleuca alternifolia* (oil essence); *Elfvingia applanata* (naringenin); *Ficus sycomorus*, grapefruit seed, garlic, allicin, peat, *Strophantus hispidus, Secamone afzeli, Mitracarpus scaberi, Entada abyssinica, Terminalia spinosa, Harrisonia abyssinica, Ximinea caffra, Azadirachta indica, Spilanthes mauritiana, Terminalia spinosa* (extracts); Cyanobacteria (ambigols A and B, Tjipanazol); Caffe (extract); *Sporochnus pedunculatus, Dalbergia melanozylon, Celastrus scandens, Juglans nigra, Kalmia latifolia, Pelargonium xhortorum, Rhus glabra* and *Lindera benzoin* (extract); *Striga densiflora, Striga orobanchioides, Striga lutea, Pistacia lentiscus* L., *Mitracarpus villosus, Bixa orellana, Bridelia ferruginea, Alpinia katsumadai, Alpinia officinarum, Artemisia capillaris, Casia obtusifolia, Dendrobium moniliforme, Epimedium grandiflorum, Glycyrrhiza glabra, Lithosperum erythrorhizon, Magnolia obovata, Morus bonbycis, Natopterygii incisium, Polygonum multiflorum, Primus mume, Rheum palmatum, Ricinus communis, Sophora flavescens, Swertia japonica*, black pepper, rosemary, red pepper, *Isopyrum thalictroides, Calotropis procera, Chrysanthemum* spp., *Holarrhena antidysenterica, Lunularia crusiata, Dumertiera hirsuta, Exormotheca tuberifera*, and liverwort (extracts); *Filipendula ulmaria, Salix glauca, Usnea filipendula, Cladina arbuscula*(salicylic compounds); *Tanacetum parthenium, Thymus capitatus*, and *Elfingia applanata* (extracts); *Fraxinus ornus* (hydroxycoumarins, esculin, esculetin, fraxin, and fraxetin); *Zizyphus nummularia*, Longo Vital, *Pelargonium* spp., *Scaevola sericea, Psychotria hawaiiensis, Pipturus albidis, Aleurites moluccana, Solanum niger, Piper methysticum, Barringtonia asiatica, Adansonia digitata, Harungana madagascariensis, Jacaranda mimosaefolia, Erythroxylum catauba, Bidens pilosa, Lemna minor, Potamo-

*geton* spp., *Nasturtium officinale, Apium nodiflorum, Agaricus subrutilescens, Amanita virosa, Amanita pantherina, Lycoperdon perlatum, Psidium guajava, Averrhoa carambola, musa sapientum, Carica papaya, Passiflora edulis, Lansium domesticum* and *Baccaurea motleyana* (extracts); horseradish, celandine grass, Bidens and Yarrow (extracts); *Abuta grandifola, Cyperus articulatus, Gnaphalium spicatum, Pothomorphe peltata, Ficus sycomorus, Ficus benjamina, Ficus bengalensis, Ficus religiosa, Alchornea cordifolia, Bridelia feruginea, Eucalyptus citriodora, Hymenocardia acida, Maprounea africana, Monachora arbuscula, Tedania ignis, Arenosclera* spp., *Amphimedon viridis, Polymastia janeirensis, Aplysina fulva, Pseudaxinella lunaecharta, Nelumbium speciosum* and *Mycale arenosa* (extracts); carnations (eugenol acetate and iso-eugenol); *Chrysanthemum boreale* (sesquiterpenoid lactones); *Eucalyptus globulus, Punica granatum, Bocconia arborea, Syzygium brazzavillense, Syzygium guineense, Carthamus tinctorius, Ginkgo biloba, Mosla chinensis, Salvia officinalis,* and *Cinnamomum cassia* (extracts); *Cryptolepis sanguinolenta* (alkaloids, cryptolepins); *Chelidonium majus* (alkaloids, berberins, coptisins); *Vitex agnus-castus* (extract); *Cladonia substellata* (usnic acid); Ellagic acid, *Fuligo septica, Tubifera microsperma* (extract); *Mundulea monantha, Tephrosia linearis* (flavonoids); *Ipomoea fistulosa* (extract); *Pimenta dioica* (oil essence); *Ratibida latipalearis, Teloxys graveolens, Dodonaea viscosa, Hypericum calycinum, Hyptis albida, Hyptis pectinata, Hyptis suaveolens* and *Hyptis verticillata* (extracts); *Asteriscus graveolones* (bisabolone hydroperoxides); *Derris scandens, Alnus rubra,* Araliaceae family (extracts); *Vinca rosea,* Australian tea tree oil, peppermint oil, sage oil, thymol, eugenol and *Thuja orientalis* (extracts); *Anacardium occidentale* (phenol lipids); *Oidiodendron tenuissimum* (extracts); *Acacia nilotica* and *Acacia farnesiana* (polyphenol, tannin); *Teminalia alata* and *Mallotus phillipinensis* (extracts); *Piectranthus grandidentatus* (abientane diterpenoids); *Pumica granatum* and *Datura metel* (extracts); tea, *Agave lecheguilla, Chamaesyce hirta, Baccharis glutinosa* and *Larrea tridentata* (extracts); *Camelia sinensis* and *Euphorbia hirta* (theaflavin, polyphenone 60); *Tabernaemontana pandacaqui, Yucca shidigera, Hemistepa lyrata, Yougia japonica, Prunella vulgaris, Lamium amplexicaule, Juniperus chinensis, Ixeris dentata, Gnaphalium affine, Chelidonium majus, Spirea prunifolia, Erythronium japonicum, Taxus wallichiana, Ganoderma lucidum, Drava nemorosa, Youngia capillaris, Equisetum arvense,* Australian lavender, black carroway, *Catuaba casca,* cineols, *Damiana, Dicranum scoparium, eucalyptus* oil, ginger, and grape kernel (extracts); neem seed, bark and leaf extract; neem oil; New Zealand manuka extracts; *Nicotiana tabacum* extract; olive leaf extract; alpha-pinene and beta-pinene extracts; rhubarb root extract; *Syringa vulgaris* extract; tea tree oil (terpinen-4-ol, alpha-terpinene, gamma-terpinene, alpha-terpineol, terpinolene); thyme (extract) and vitamin E (extract).

Likewise possible for use are antifouling-active extracts from, among others, algae, sponges, corals, and mussels, such as, for example, terpenes, gramins, pyrroles, pyrazoles, phenols, amides and steroids, and also their derivatives.

The product system of the present invention may comprise one or more active ingredients. In this case the active ingredients may also be present in the form of a homogeneous mixture within the porous carrier. Furthermore, the active ingredients may also be arranged in layer form within the porous carrier, in which case the porous carrier may have two, three or more layers, which may differ in nature and composition of the active ingredients.

In addition to the active ingredients, the antifouling additives of the invention may, in one particularly preferred embodiment of the present invention, comprise one or more envelope substances which form a protection system for the active ingredient. A protection system for the purposes of the present invention means an envelope substance/a combination of two or more envelope substances that prevents/prevent the active ingredient from decomposing and/or prematurely reacting and/or being able to emerge unintendedly from the carrier material. The term "protection system" has been chosen in order to make it clear that the present invention is not using a conventional coating, in which the carrier particle is enveloped completely by the envelope substance, in order to obtain controlled release of active ingredients. Instead, the system is designed so as to ensure high mechanical stability of the protection system. As a result of the fact that a large part of the outer surface of the antifouling additives of the invention is formed by the carrier material, and the protection system is present largely or completely in the pores, the additives of the invention have significant advantages over, for example, core-shell composite particles. With the latter particles, the pores are given a full charge of active ingredient, and then a protective shell of the envelope substance is produced around the fully charged particles. If this shell is destroyed wholly or partly by—for example—mechanical events, the active ingredient may be released without hindrance. The protection system of the invention is incorporated largely, i.e. preferably to an extent of at least 30% by weight, more preferably 50% by weight, very preferably 70% by weight—based in each case on the amount of active ingredient used—into the pores of the carrier material after the latter has been impregnated with active ingredient. In this embodiment, with particular preference, there is no active ingredient on the surface of the particles. Preferably, therefore, the additives of the invention are distinguished by the fact that a layer of active ingredient which is arranged closer to the core of the carrier material, and a protective layer which is arranged towards the outer surface of the carrier material, are formed in the pores. The active ingredient is therefore shielded from effects exerted by the surroundings.

The incorporation of the protection system largely or completely into the pores of the carrier material means that the antifouling additives of the invention are externally dry powders, preferably free-flowing powders. This means that the free-flowability of the product as measured using the flow funnels of DIN 53492 has a value preferably of 1. The additives of the invention can therefore be processed and transported to particularly good effect.

As regards the mode of action of the protection system, it may be assumed, for example, that the protective compound seals the pores of the porous carrier, which has been partially provided with active ingredient. Following partial dissolution or partial destruction of this seal of the pores, the active ingredient can be released. The protection system for the active ingredient/ingredients is preferably designed such that the protection system dissolves in water, thereby allowing the active ingredient to be released. It is also preferred, however, for the additives of the invention to have a protection system in the form of a matrix, through which the active ingredient is able to diffuse and/or water is able to reach the active ingredient.

The time-delayed release of active ingredient can be controlled, for example, through the choice of the carrier material—the pore size distribution, for example—and/or of the active ingredient. An alternative option is to produce different antifouling additives with, for example, different envelope substances, or to produce different antifouling additives each with the same envelope substance but with different amounts or thicknesses of the envelope substance, and to mix them, so that the diffusion times through the envelope material or the dissolution rate of the envelope material of different particles are different in length. The active ingredient-carrier combination is selected in accordance with various profiles of requirements. Relevant considerations include the question of geographical area of use (climate, environmental requirements), maintenance intervals, lay times, travel speed, and processing criteria. Accordingly, the selection of the active ingredient and of the envelope substance is made according to the following criteria: effectiveness over the requisite time period, statutory approval restrictions, required release time, solvent of the surface-coating system. The skilled person is capable of carrying out corresponding optimization by means of simple tests.

Particularly suitable envelope substances are water-soluble, water-swellable or biodegradable polymers from the classes of the polysaccharides, block copolymers, caprolactones, lactide and glycolide polymers, polyanhydrides, polyesters, hydroxybutyric acids, polyphosphazenes, polyphosphoesters, such as polyethylene glycol, polyvinyl alcohol, polyvinyl acetate, alginate, gelatin, agar, pectin, and chitosan.

It has proved to be advantageous if the weight ratio of protection system to active ingredient is in the range from 10:1 to 1:10. The ideal ratio depends on the chemical nature and the physicochemical properties of the active ingredient and of the carrier material, and also of the protection substance, and can be determined for each combination of materials by means of simple series of experiments. A higher carrier material charge may mean that sufficient protection substance can no longer be introduced into the pores. Too low a charge is not economically rational. With particular preference the weight ratio of protection system to active ingredient is in the range from 10:1 to 1:10, very preferably in the range from 5:1 to 1:5 and more particularly preferably in the range from 2:1 to 1:3.

As well as the weight ratio it may be advantageous, depending on combination of materials, to observe a defined proportion between DBP absorption and amount of active ingredient absorbed. Without being tied to any particular theory, the inventors are of the view that DBP, the active ingredients to be absorbed, and the protection substances frequently have a similar space occupancy in the pores of the carrier material and also penetrate pores of similar size. Accordingly, this proportion provides information on how much space is still present in the pores that are accessible to the protection substance, and is therefore able to ensure that a sufficient amount of active ingredient and also protection substance can be introduced into the pores. Hence it has proved to be advantageous for the active ingredient charge of the porous carrier to be at least 10% to 90% by weight, preferably 10% to 80% by weight, more preferably 20% to 70% by weight and very preferably 30% to 60% by weight, based on the DBP absorption of the porous carrier. In one special embodiment the active ingredient charge of the porous carrier is 1% to 9% by weight, based on the DBP absorption of the porous carrier.

As already explained, it is an essential feature of the silicas of the invention that the greatest amount of protection substance is present within the pores of the carrier material, and not absorbed on the surface of the carrier material. In this way it is possible to prevent the protection system becoming damaged, by abrasion, for example, and deactivated. For the same reason it has proved to be advantageous to specify the absorbed quantity of protection substance in relation to the DBP absorption of the carrier material. It has proved to be particularly advantageous for the protection substance charge of the porous carrier to be at least 10% to 90% by weight, preferably 10% to 80% by weight, more preferably 20% to 70% by weight and very preferably 20% to 50% by weight, based on the DBP absorption of the porous carrier. If the charge is too low, then, depending on the pore structure of the carrier material, there may be a deterioration in the effect of the protection system. Too high a quantity of protection system may have adverse consequences for the targeted deactivation and/or is economically ineffective, since the aim is to accommodate the maximum amount of active ingredient and the minimum amount of protection substance.

The antifouling additives of the invention can be produced by contacting at least one porous, preferably inorganic solid with at least one active biocidal and/or antifouling-active ingredient in such a way that the active ingredient is drawn into the pores of the solid.

In the case of liquid active ingredients, the active ingredient may be drawn directly into the carrier material. For this purpose, the carrier material can be placed in a suitable mixer and the active ingredient can be added by metering, dropping, spraying, etc. Corresponding technologies are known to the skilled person.

In the case of non-liquid active ingredients, they may be dispersed in a dispersion medium or dissolved in a solvent. The carrier material is then contacted with the solution or dispersion, by immersion, for example, or the solution or dispersion is sprayed on, and hence the active ingredient together with the solvent or dispersion medium is drawn into the pores of the carrier. The solvent or dispersion medium is subsequently removed, by evaporation, for example.

In one variant of the process of the invention the active ingredient itself is actually produced within the carrier material. This can be done by causing one or more precursors of the active ingredient to be drawn into the carrier material, and then generating the active ingredient by chemical reaction or physical exposure. Physical exposure may be, for example, a heat treatment at high temperature (calcining).

One example of a chemical synthesis of active ingredient within the carrier is the charging of the carrier with sodium alginate and subsequently with a ZnCl solution, thus forming zinc alginate as active substance in the pores of the carrier.

Another way of absorbing non-liquid active ingredients into the carrier material is to melt the active ingredient, so that the carrier material draws up the melted active ingredient. This way, however, works only for active ingredients which can be melted without decomposition.

As already observed, it is particularly preferred for the antifouling additives of the invention not to have any active ingredient on their outer surface. By outer surface is meant the surface which is not formed by pores or other cavities in the interior of the carrier particles. This can be achieved by washing the charged particles with a solvent in which the active ingredient is soluble. The washing operation must be controlled such that it is quick enough for substantially only the active ingredient adhering to the surface of the particles to be washed off, and not the active ingredient which has been drawn into the pores. Since the release of active ingredient from the pores is diffusion-controlled, i.e. controlled by a slow process, only a little active ingredient is leached from the pores in a rapid wash. Alternatively, active ingredient adhering to the surface of the carrier particles may also be inhibited. This can be done, for example, through chemical reaction with a suitable agent.

In one specific embodiment of the present invention, the antifouling additives of the invention have a protection system. These additives of the invention can be produced by contacting an active ingredient with a porous carrier and, following absorption of the active ingredient, generating a protection system by contact with at least one envelope substance.

In one particularly preferred variant of the present invention, the process of the invention comprises the following steps:
a) introducing at least one carrier material in a solids mixing unit
b) optionally evacuating the solids mixing unit
d) optionally adding at least one active ingredient in the solids mixing unit
e) impregnating the carrier with active ingredient
f) optionally inhibiting the active ingredient adhering to the outer particle surface of the carrier material, and/or washing and/or drying.

Where additionally a protection system is generated, then one or more of the following steps may also be included:
c) optionally preimpregnating the carrier material with at least one protection substance up to a maximum of 50% by weight of the absorption value (corresponding to the DBP number)
g) adding at least one protection substance
h) impregnating the carrier with at least one protection substance
i) optionally washing and/or drying
j) optionally reactively inhibiting the active ingredient adhering to the outer particle surface of the carrier material, and/or washing and/or drying.

Examples of solids mixing units which can be used in step a) include the following: kneaders, paddle dryers, tumble mixers, vertical mixers, paddle mixers, Schugi mixers, cement mixers, Gericke continuous mixers, Eirich mixers and/or silo mixers. The temperature in the mixing unit, depending on the protection system and on the active ingredient, is preferably between 5° C. and 250° C.

Step b) is optional, i.e. need not necessarily be carried out. By evacuating the solids mixing unit following addition of the carrier material, however, it is possible to evacuate the pores of the carrier material and to extract gas or air contained therein, thereby allowing a more complete charging of the carrier material with active ingredient(s) and protection substance(s) to be achieved.

In step d), the active ingredient, or two or more active ingredients, is or are added to the solids mixing unit. If two or more active ingredients are to be added, they may be added simultaneously or in succession. Where they are liquid, the active ingredients can be added directly or as a melt, or else as a solution or in the form of a dispersion or suspension. The class of the active ingredients may include all biocidal and/or antifouling-active, approved, biodegradable substances for use in the aquatic area that do not pose a hazard to the environment.

In step e), the active ingredient/ingredients is or are introduced into/onto the carrier material and/or the preimpregnated carrier material. In this case the mixing time/incorporation time is made such as to ensure maximum penetration of the active ingredients into the pores, or complete adhesion. Impregnation with an active ingredient is at an end when the free-flowability of the product as measured with the flow funnels in accordance with DIN 53492
see also description of measurement methods later on below
has a value of between 1 and 4, preferably between 1 and 3, more preferably between 1 and 2, and very preferably a value of 1. In one particularly preferred embodiment the active ingredient is dissolved in a solvent, the solution is brought into/onto the support, and the resulting product is dried in order to remove the solvent.

In one specific variant of the present invention, the biocides and active antifouling-active ingredients and also the protection system are largely or completely embedded in the pores of the carrier material, and so parts of the outer surface of the carrier material are bare. In accordance with the invention the exposure to the active ingredients of life forms other than those which attach to the surface of the objects to be protected ought as far as possible to be avoided. Since, though, during impregnation in step e), i.e. during the drawing of the active ingredient into the pores, it is generally not possible to prevent at least a few molecules of active ingredient adhering to the outer surface of the carrier, it can be sensible to inhibit these active ingredient molecules in an optional step f) or to remove them from the outer surface of the carrier, by washing, in order to ensure that active ingredient is in fact present only in the pores. In the case of inhibition, active ingredient lying on the surface is reacted by means of a corresponding reactant to form a non-reactive substance. In the case of washing, the active ingredient is washed off by means of suitable solvent. Depending on active ingredient, two or more washing operations are necessary. Where the active ingredient/ingredients has/have been added in the form of a solution or suspension, the solvent is preferably removed before the protection substance is added, preferably by means of evacuation or baking.

Where a protection system is generated, steps below may optionally be carried out.

Step c) is optional and is carried out depending on the existing pore structure of the carrier material. For the efficiency of the protection system of the invention it is necessary for the pores as far as possible completely to be sealed outwardly with protection substances, so that the active ingredient is protected from contact with solvents. In the majority of porous carrier materials, the pores communicate with one another in a more or less complex system. As a result it is possible for narrow pores in the interior of the carrier material, into which neither active ingredient nor protection substance is able to penetrate, owing for example to the viscosity, but which are accessible to solvent, to communicate with a pore into which the active ingredient has penetrated. In this way it would be possible for the active ingredient, although not being able to be dissolved out of the actual pore into which it has been drawn, to nevertheless come into contact in the interior of the carrier with solvent, through the smaller "secondary pore", and hence to be dissolved out to some extent nevertheless. By preimpregnation of the carrier material with the protection system it is possible to prevent such unwanted effects, since these "side channels" can be sealed off by this means before the active ingredient is absorbed. In particularly preferred embodiments, protection substance is introduced in the form of a solution or as a melt.

In step g), the protection substance, or two or more protection substances, is or are added to the solids mixing unit. If two or more protection substances are to be added, they may be added simultaneously or in succession. Where they are liquid, the protection substances may be added directly or as a melt or else as a solution or in the form of a dispersion or a suspension. In particularly preferred embodiments, protection substance is introduced in the form of a solution or as a melt. It must be ensured in step h) that the pores are filled as far as possible completely, since the pores that lead from the surface to the core of the carrier particle communicate with one another through inter-pore channels, which transmit solvent and could therefore result in the release of the active ingredient. Where the protection substance/protection substances has/have been added in the form of a solution or suspension, it is preferred to remove the solvent by evacuation or baking.

In order to remove excess protection substance it is possible, if necessary, for a washing step with subsequent drying to take place in step i).

Depending on the active ingredient and protection system it may be sensible, instead of the inhibition and/or washing-off of the active ingredient adhering to the outer surface of the carrier, in step f), to carry out this inhibition and/or this washing operation following application of the protective layer, i.e. in step j). In general it will be more effective to carry out the washing and/or inhibition in step j) rather than in step f), since in step g) the pores have been sealed by the protection substance and hence in step j) only the molecules of active ingredient that are adhering to the outer surface are eliminated. It is also possible to carry out washing and/or inhibition both in step f) and in step j). It is also possible to carry out washing and inhibition in step f) and/or j).

In special cases, stages b) to e) and/or g) to h) are carried out repeatedly, and, in the case of repetition of steps d) and e) and/or g) and h), identical or different active ingredients and/or protection substances may be used in each case. It is advantageous, furthermore, to select the protection substance and/or the active ingredient in steps c), d), e), g) and h), and also the mixing conditions, such that the active ingredient and/or protection substance always remains liquid and does not dry out or crystallize out on the surface of the particles.

In one particular embodiment of the process of the invention, step d) is carried out not after but rather before step a), i.e., the carrier material and the active ingredient/ingredients are mixed before being introduced into the solids mixing unit. Particular advantages in this case lie in the uniformity of the distribution of active ingredient in the carrier particles. This is very important in the case of a high active ingredient charge, in order subsequently to be able to charge all particles uniformly with the protection system.

In another particular variant of the process of the invention, the carrier material can be pretreated with surfactants or with silanes before the active ingredient and/or protection system is added. This may on the one hand make the carrier hydrophobic, as a consequence of which—depending on the polarity of the carrier—it may be made easier for the active ingredient/ingredients to penetrate the pores deeply. On the other hand, however, it may also have the effect of sealing ultra-fine pores, which is desirable, since in this way it is possible to prevent unwanted, rapid release of active ingredient.

In principle it is also possible to carry out steps c) and d) simultaneously and to add a mixture of at least one active ingredient and at least one protection substance. This may be particularly sensible when the protection substance is able to penetrate into smaller pores than the active ingredient and hence it is possible for the effect described above to occur, i.e. the "sealing" of side pores, even when introduction of protection substance and active ingredient is simultaneous.

In order to ensure the best possible functionality of the additives of the invention, more particularly the mechanical stability, care should be taken to ensure that, on the one hand, there is no active ingredient on the carrier surface, and on the other hand that there is also, as far as possible, no protection substance present on the outer surface of the carrier. Both components ought ideally to have been drawn completely into the pores of the carrier material. In order for this to be achieved, the amount of protection substance/substances added in step g) ought to be regulated such that the total amount of active ingredient/ingredients plus protection substance/substances added during the production of the product systems corresponds to 50% to 100% of the absorption value (in accordance with DIN 53601) of the carrier material.

Alternatively, however, the production operation may also be controlled via the pore volume; in that case, preferably, the amount of protection substance/substances added in step g) is regulated such that the total amount of active ingredient/ingredients and protection substance/substances added during production of the antifouling additives is greater than the total pore volume of the carrier material, and that the excess of protection substance/substances is absorbed by addition of carrier material and/or of carrier material charged with active ingredient/ingredients.

The mixing intensities and the metering in the process of the invention ought to be harmonized with one another such that the free-flowability at the end of the application process is ensured, i.e. that at every point in time there is a free-flowable powder present in the mixer. This makes it possible to ensure that the protection substance and/or active ingredient is taken up fully into the pores and does not adhere to the outer surface of the carrier. If metering takes place too quickly or if mixing takes place at too low an intensity, the charging of the particles may lack uniformity, and ultimately this may result in the pores of some particles being filled completely with active ingredient, with no possibility any longer for protection substance to penetrate. Details of this method may be found in DE102008000290. The content of said patent application is hereby adopted explicitly into the content of the present specification.

Conventional methods in which a large amount of active substance is added rapidly to the carrier material have the disadvantage that there may be gas inclusions in the pores, i.e. that the pores are filled not, as desired, with active ingredient, but rather with gas.

In connection with the choice of the mixing assembly, attention should also be paid to ensuring that the stirring elements, e.g. IKA Duplex mixing element in the H60 recording extruder or Somakon MP, are selected such that shearing stress produces very little or no abrasion. The test for abrasion on the particles is carried out by measuring the particle size distribution. For this purpose, in the mixing unit used subsequently, the carrier materials are introduced and the mixing operation is commenced in accordance with the subsequent procedure. After a defined mixing time, samples are taken and their particle size distribution is ascertained. In the particle size distribution, the deviation from the $d_{50}$ value of the initial sample ought to be not greater than 5%. If, for example, the result of the particle size distribution prior to mixing is as follows:

Average particle size $d_{50}$=23.72 μm
and the result of the particle size distribution after mixing is as follows:
Average particle size $d_{50}$=22.74 μm
then this condition is met.

The coating systems of the invention may preferably comprise an eroding, self-polishing surface-coating system or a surface-coating system having an insoluble matrix. Using the antifouling additives of the invention makes it possible additionally to obtain a microstructuring which has anti-stick properties in the sense of an anti-stick coating. Eroding, self-polishing systems comprise a soluble binder matrix which is continuously hydrolysed over a relatively long time period, as a result of which, at the same time, the antifouling additives of the invention are delivered to the surrounding medium. As a result of the deliberate abrasion, fresh antifouling additives from deeper layers of coating arrive continuously at the surface of the coating, thereby providing a particularly effective defence against biofouling.

In the case of surface coatings with an insoluble matrix, only the active ingredient is dissolved out of the coating film, and so the coating network present is a porous network with a continuously decreasing concentration of active ingredient. In this case, the time profile of active ingredient delivery can be controlled not only by the antifouling additive but also by the surface-coating matrix.

Anti-stick coatings, especially those with silicone polymers or fluoropolymers, are among the physical defence methods. These coatings do not prevent the growth of fouling. Instead, the effect is based on making it more difficult for the organisms to attach, as a result of the low surface energy, or making the surface easier to clean with little mechanical effort, i.e. little surrounding flow. For the user this means that low travel speeds and/or low cleaning effort are sufficient to clean off the fouling. The same principle forms the basis for the use of microstructured coatings which derive, for example, from the template of shark skin. When the antifouling additives of the invention are mixed into these coating systems, the physical and chemical defences can be ideally combined, and synergistic effects produced. Hence it is possible to eliminate the disadvantage of purely physical defence methods, such as their low mechanical stability, meaning that they are likely to be significantly affected in their efficiency if the coating surface is damaged. It is also possible to eliminate the disadvantage that a certain travel speed of the object, or a certain surrounding flow around the underwater structure, is a prerequisite for the physical effect. The system of the invention ought ideally to ensure easy cleaning as well as the active antifouling effect.

The antifouling additives of the invention can be incorporated into all conventional antifouling coating systems. The composition and other ingredients of such coating systems are known to the skilled person. One, non-exclusive example of this is described in WO2007030389 paragraphs 52 to 75. The content of that application, and particularly the content of the stated paragraphs, with the proportions specified therein, is hereby explicitly adopted into the content of the present specification.

The coating systems of the invention have the advantage that not only the particle carriers but also the active substance are environment-friendly. Through a suitable combination of active ingredient system and carrier system it is possible to carry out individual adaptation to different profiles of requirements (sporting boats, professional shipping).

As shown above, the antifouling additives of the invention are compatible with a very wide variety of coating formulations and therefore have diverse possible uses. This increases once again their flexibility in the release of active ingredient. As shown above, release can be controlled through a suitable combination of carrier material and active ingredient. The addition of a protection substance represents a further means of controlling the release. Finally, the release can be controlled still further as a function of the coating formulation (eroding or non-eroding surface-coating system).

With the coating systems of the invention it is possible to coat all objects which are subject to the risk of biofouling. These include, in particular, sporting boats, commercial ships, devices and structures which are immersed in water, such as jetties, quays, drilling platforms, etc., water traffic markings, other buoys, measuring probes.

Besides their use in the underwater area, however, the additives of the invention can also be used in wet room applications. These include, for example, paints, coatings and seals.

Measurement Methods
XPS Analysis of the Surface Composition

An important characteristic of the composite particles described lies in the maintenance of the silica particle surface. The active ingredient and the envelope substance are located only in the pore system, and so the surface of the particle continues to be composed of $SiO_2$ groups. This feature is critical in order that, through the use of these composite particles, the original processing properties and compatibilities with various coating formulations remain unaffected. The pure, clean silica particle surface is detected by means of X-ray-induced photoelectron spectroscopy (XPS). This allows surface-sensitive detection of the elemental composition, and also an analysis of the binding conditions.

Measurement Principle

Figure 1:
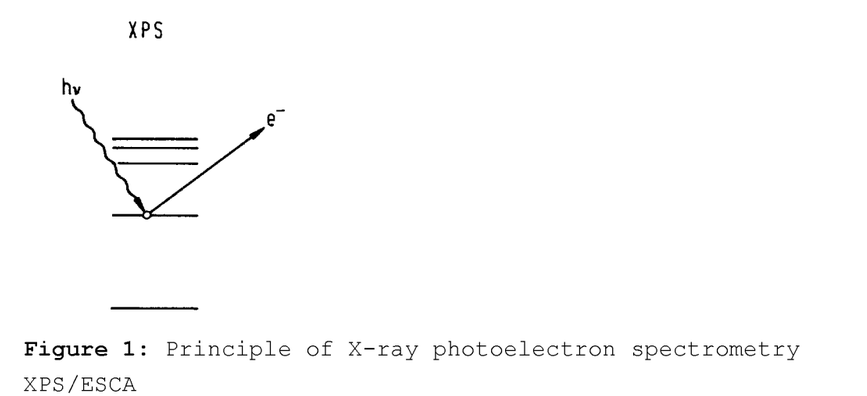
FIG. 1 depicts the principle of X-ray photoelectron spectrometry XPS/ESCA.

The surface of a material is bombarded under ultra-high-vacuum conditions with soft X-radiation (e.g. $MgK\alpha$, $AlK\alpha$). This removes what are called photoelectrons, whose kinetic energy after leaving the surface of the material is analysed using an electron spectrometer (FIG. 1).

Where the sample measured is a metallic sample which is in electrically conducting contact with the spectrometer, the kinetic energy of the photoelectrons removed is given by:

$$E_{kin} = h\nu - E_B - \Phi_{Sp}'$$

i.e. the energy of the irradiated X-radiation ($h\nu$) minus the binding energy ($E_B$) minus the work function of the spectrometer ($\Phi_{Sp}'$). In the case of electrically non-conducting materials there are also contributions to be taken into account.

From this relationship between the excitation energy and the measured kinetic energy, therefore, it is possible to determine the binding energy of the electrons to the sample atoms. This energy is directly dependent on the chemical binding state of the elements. For example, therefore, for metallic platinum on a carrier, the value measured is different from that for divalent or tetravalent platinum. Sulphate sulphur yields values different from those for sulphide sulphur or sulphane sulphur, and PMMA yields different oxygen and carbon signals than polycarbonate, polyoxymethylene or Teflon.

Figure 2:
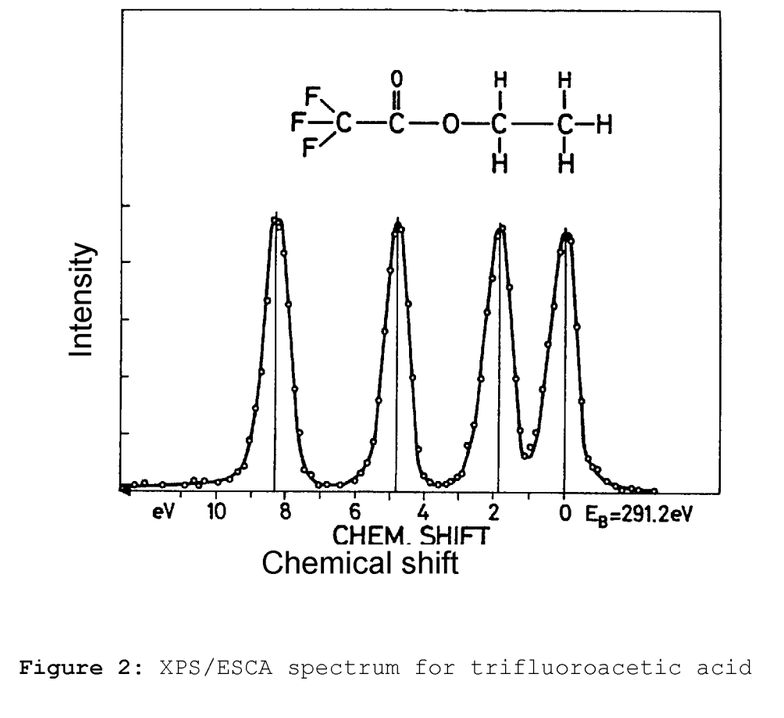
FIG. 2 depicts the XPS/ESCA spectrum for trifluoroacetic acid.

A classic example of an XPS result is given in FIG. 2. It is apparent that even different binding states of the carbon in ethyl trifluoroacetate can be identified on the basis of the "chemical shift" of the C signals. From the "chemical shift" of the XPS signals it is possible, therefore, to differentiate differently bonded atoms from one another, as a result of which it is possible to determine the magnitude of the fraction of the carrier and/or active-ingredient and/or protection-substance atoms on the surface of the antifouling additives of the invention. In view of the possibility of being able to differentiate differently bonded atoms from one another, K. Siegbahn coined the name "ESCA" for this measurement technique (electron spectroscopy for chemical analysis), since chemical information is supplied.

XPS spectra allow determination of which elements are present at which concentration in the region of the topmost atomic layers of materials, and the "chemical shift" of the XPS signals allows determination of the chemical binding state in which they exist.

By means of EDP-assisted evaluation methods it is possible to quantify this with high reproducibility. The values determined in this context typically correspond to a figure in area percent.

Using overview surface analyses, for example, it is possible to capture, for example, 0.5 $cm^2$ of a surface integrally, although the depth of penetration of the analysis is confined to the uppermost atomic layers. In this way, any microinhomogeneities present are averaged out.

The measurement of the photoelectrons emitted from the sample, as in the case of the XPS/ESCA technique, detects exclusively the region of the uppermost atomic layers, since the average free path length of these electrons is just a few atomic layers. Electrons which are released by ionization processes in deeper layers are no longer able to reach the surface and hence are unable to leave the sample. Consequently, the XPS technique using soft X-ray excitation radiation and measuring the low-energy photoelectrons removed as a result is automatically surface-specific and is focused on the surface properties of materials.

A further advantage of XPS is that, apart from hydrogen and helium, even light elements such as boron, carbon, nitrogen and oxygen can be detected quantitatively and a direct observation made of their chemical binding states.

Figure 3:
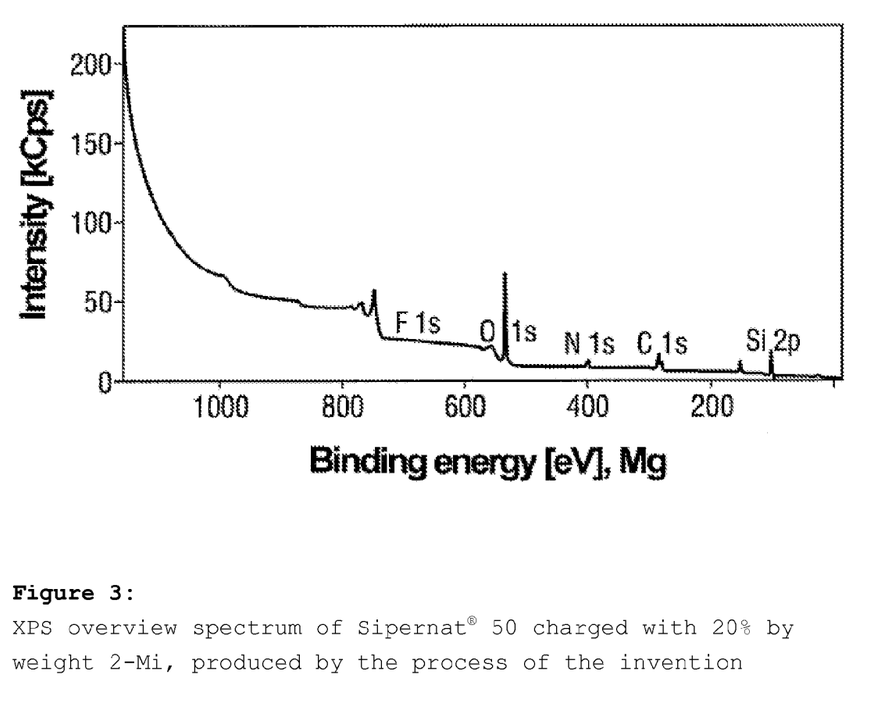
FIG. 3 depicts an XPS overview spectrum of Sipernat® 50 charged with 20% by weight 2-Mi, produced by the process of the invention.

FIG. 3 shows, as a general demonstration of the functioning of the XPS method, an XPS overview spectrum of Sipernat® 50 charged with 20% by weight of 2-methylimidazole by the process of the invention in accordance with claim 15. It can clearly be seen which part of the surface is formed by $SiO_2$ and which by 2-methylimidazole (which is not an active ingredient of the invention, but instead is only a demonstration substance for the purpose of illustrating the XPS method). By background subtraction and the use of the relative sensitivity factors of the elements, standardized methods can be employed to determine, from these data, quantitative information relating to the surface composition.

Procedure for XPS Measurements

The XPS measurements are carried out on powder beds, with integral detection of 0.5 square centimeter in each case. In order to prevent sample contamination and measurement artefacts, the samples are placed in a gold-coated, ultrapure-tantalum sample container (Alfa, 99.98%, approximately 0.25 mm in thickness, approximately 1.5 to 2 cm in size) in such a way that there is no caking, clinging or compaction of the samples. The amount of sample is chosen such that the holder is largely filled and such that at least an area of 0.5 square centimeter can be measured. Each sample is then transferred to a preliminary chamber of the XPS spectrometer (Leybold LHS12 or Leybold MAX 100 XPS system) and the chamber is evacuated to $10^{-8}$ mbar at room temperature for approximately 2 hours. After that, the sample under analysis is transferred into the main chamber of the XPS spectrometer, and the vacuum is increased to $4 \times 10^{-10}$ mbar in order to prevent impurities and measurement artefacts caused by possible hydrocarbon contamination or cross-contamination. The purity of the vacuum and of the residual gas in the measuring chamber of the XPS spectrometer is monitored continuously by means of a residual gas mass spectrometer (Quadrex 200, Inficon). The XPS measurements are carried out by the ESCA method, using MgK$\alpha$ radiation, with an energy of 150 W. The electron energy analyzer (Leybold EA200) is operated with a pass energy of 72 eV in "fixed analyzer transmission" (FAT) mode. The reference used for the binding energy scale of the spectrometer was the $Au_4f_{7/2}$ signal of the SCAA83 standard from the National Physical Laboratory (NPL, Teddington, UK) at 84 eV, which is measured before and after the measurement of the sample under analysis. The electrostatic charging of the samples under analysis is compensated by low-energy electrons from an electron source of controlled incandescence which is mounted in the vicinity of the sample holder. This emission source, in turn, is shielded and insulated thermally, in order to prevent direct heat transfer to the sample under analysis.

Evaluation is carried out in accordance with the general recommendations of DIN technical report 39 and National Physical Laboratory Report DMAA(A)97, Teddington, UK, January 1987, and the existing knowledge of the working committee on "surface and microregion analyses" NMP816 (DIN). A DS 100 data set is utilized in order to evaluate the XPS data by means of standard routines (with subtraction of the X-ray satellites and of the background, and with account taken of the relative sensitivity factors valid for the spectrometer used (and stored in the data system of the spectrometer) for the electron level indicated in each case). All figures are given in area percent.

Analysis of the Physicochemical Properties of the Carrier Material

Determination of the DBP Number:

The DBP absorption (DBP number), which is a measure of the absorbency of a porous carrier material, is determined in a method based on standard DIN 53601, as follows:

12.50 g of carrier material in powder or bead form and with a moisture content of 0%-10% (the moisture content is adjusted if necessary by drying in a drying cabinet at 105° C.) are introduced into the kneader chamber (article number 279061) of the Brabender Absorptometer "E" (without damping of the outlet filter of the torque transducer). In the case of granules, the sieve fraction from 3.15 to 1 mm (stainless steel sieves from Retsch) is used (by gentle pressing of the granules through the sieve with a pore size of 3.15 mm using a plastic spatula). With continuous mixing (kneader panels rotating at a speed of 125 rpm), dibutyl phthalate is added dropwise at room temperature to the mixture at a rate of 4 ml/min using the Brabender T 90/50 Dosomat. Its incorporation by mixing takes place with only a small amount of force, and is monitored by means of the digital display. Towards the end of the determination the mixture becomes pasty, which is indicated by a sharp increase in the required force. When the display shows 600 digits (torque of 0.6 Nm), an electrical contact shuts off both the kneader and the DBP feed. The synchronous motor for the DBP feed is coupled to a digital counter, and so the consumption of DBP in ml can be read off.

The DBP absorption is reported in the unit [g/(100 g)] with no decimal places, and is calculated using the following formula:

$$DBP = \frac{V*D*100}{E} * \frac{g}{100g} + K$$

where
  DBP=DBP absorption in g/(100 g)
  V=consumption of DBP in ml
  D=density of DBP in g/ml (1.047 g/ml at 20° C.)
  E=initial mass of silica in g
  K=correction value from moisture correction table, in g/(100 g)

The DBP absorption is defined for anhydrous, dried carrier materials. When moist carrier materials are used, especially precipitated silicas or silica gels, it is necessary to factor in the correction value K for the calculation of the DBP absorption. This value can be ascertained from the correction table below; for example, a water content in the carrier material of 5.8% would imply an add-on of 33 g/(100 g) for the DBP absorption. The moisture content of the carrier material is determined in accordance with the method described below for "Determination of the moisture content or loss on drying".

TABLE 1

Moisture correction table for dibutyl phthalate absorption - anhydrous -

| % moisture content | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |

TABLE 1-continued

Moisture correction table for dibutyl phthalate absorption - anhydrous -

| % moisture content | .% moisture content | | | | |
|---|---|---|---|---|---|
| | .0 | .2 | .4 | .6 | .8 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Oil Number

The oil number is determined in accordance with DIN EN ISO 787-5 using linseed oil.

Determination of the Moisture Content or Loss on Drying

The moisture content or loss on drying (LoD) of carrier materials is determined in a method based on ISO 787-2 after 2-hour drying at 105° C. This loss on drying is composed predominantly of water moisture.

Procedure 10 g of the carrier material in powder, bead or granule form is weighed out to an accuracy of 0.1 mg (initial mass E) into a dry glass weighing boat with ground-glass lid (diameter 8 cm, height 3 cm). With the lid open, the sample is dried in a drying oven at 105±2° C. for 2 h. Thereafter the weighing boat is closed and is cooled to room temperature in a desiccator cabinet with silica gel as drying agent.

The weighing boat/glass beaker is weighed to an accuracy of 0.1 mg on a precision balance, in order to determine the final mass A. The moisture content (LoD) in percent is determined in accordance with $$TV=(1-A/E)*100,$$

where A=final mass in g and E=initial mass in g.

Average Particle Size $d_{50}$

The particle distribution of the product systems of the invention is determined by the principle of laser diffraction on a laser diffractometer (Horiba, LA-920). The particle size of powders is determined by preparing a dispersion having a weight fraction of approximately 1% by weight $SiO_2$, by stirring the powder into water.

Immediately after the dispersing operation, the particle size distribution of a sample of the dispersion is determined using the laser diffractometer (Horiba LA-920). The relative refractive index to be selected for the measurement is 1.09. All measurements are made at room temperature. The particle size distribution and also the relevant variables, such as the average particle size $d_{50}$, are calculated automatically by the instrument and displayed as a graph. Note should be taken of the indications in the operating instructions.

Determination of the BET Surface Area

The specific nitrogen surface area (referred to below as BET surface area) of the silica in powder form, containing approximately spherical particles, or in granular form, is determined in a method based on ISO 5794-1/Annex D using the TRISTAR 3000 instrument (from Micromeritics) and the multipoint determination of DIN-ISO 9277.

Determination of the Tapped Density

The tapped density was determined in accordance with DIN EN ISO 787-11.

Determination of the Total Pore Volume

The total pore volume is determined by means of mercury porosimetry. The method is based on the Hg intrusion of DIN 66133 (with a surface tension of 480 mN/m and a contact angle of 140°), using an Autopore IV 9500 instrument from Micromeritics.

Prior to the measurement, the silica is subjected to a pressure treatment. This is carried out using a manual hydraulic press (order No. 15011 from Specac Ltd., River House, 97 Cray Avenue, Orpington, Kent BR5 4HE, UK). 250 mg of silica are weighed into a pellet die with an internal diameter of 13 mm, from Specac Ltd., and loaded with 1 t according to the display. This load is maintained for 5 s and readjusted if necessary. Thereafter the sample is decompressed and dried in a forced-air drying cabinet at 105±2° C. for 4 h.

The silica is weighed out to an accuracy of 0.001 g into the type 10 penetrometer and, for effective reproducibility of the measurement, the initial mass is selected such that the "stem volume used", in other words the percentage volume of Hg consumed to fill the penetrometer, is 20% to 40%.

The penetrometer is subsequently evacuated slowly to 50 μm Hg and left at that pressure for 5 min.

The Autopore instrument is operated according to the operating instructions with the software version IV 1.05. Each measurement is corrected by a blank measurement of the penetrometer. The measurement range is 0.0042-414 MPa.

Determination of the Grindometer Value

The grindometer value is determined in accordance with DIN EN 21524.

Determination of the Free-Flowability

The free-flowability is assessed using glass flow vessels with different outflow diameters. Evaluation takes place using ratings 1-7 (see Table 2). The figure reported is the measurement vessel from which the powder still just flows without coming to a halt.

TABLE 2

| Vessel No. | Outflow width [mm] | Evaluation while powder flow is still smooth |
|---|---|---|
| 1 | 2.5 | Very good |
| 2 | 5 | ↑ |
| 3 | 8 | |
| 4 | 12 | |
| 5 | 18 | |
| 6 | 24 | |
| 7 | | Inadequate (does not run though No. 6) |

The examples which follow serve to illustrate the present invention, but without restricting it in any way.

General Description of Methods a) Introduction of the Active Ingredient into a Porous Carrier The carrier material, for example porous $SiO_2$, is placed in a mixer (e.g. Somakon, IKA kneading apparatus) and the mixing operation is commenced. The liquid active ingredient is metered in by slow dropwise addition (ratio e.g. 30% by weight $SiO_2$ to 70% by weight liquid active ingredient). The particles remain free-flowing. As a result of the energy input and the forces of adsorption and/or capillary action in the interior of the porous $SiO_2$ structure, the active ingredient is conveyed to the centre of the carrier. It is also possible to dissolve a non-liquid active ingredient in a corresponding solvent and then to continue as described above. It is likewise possible to apply the active ingredient from the melt. For that purpose the mixer may be heated.

In order to adjust the concentration of active ingredient, the operation may be repeated as often as desired, or solutions with corresponding concentrations can be prepared. Between the steps, however, a drying step must be carried out in order to remove the solvent.

Precise details are given in experimental description c).

b) Preparation of a Protection System in the Carrier Charged with Active Ingredient The carrier-supported material is placed in a mixer. The protective envelope may be metered in from solution by slow dropwise addition. It is advantageous to choose a solvent which does not dissolve the active ingredient. The solution is preferably saturated with the envelope substance, in order to maximise introduction into the porous carrier. Then a drying step must be carried out. For that purpose a temperature is selected which is below the melting temperature of the envelope substance and also below the boiling point of the solvent. Under the conditions identified above, drying may also be carried out under reduced pressure. When the particles have completely dried, the operation can be repeated in order to apply a further envelope layer. The particles are subsequently free-flowing.

It is also possible to apply an impervious envelope layer via a melt. In that case the active ingredient ought to be stable in the melting range of the envelope substance.

c) Experimental Description

Example 1

Geraniol was encapsulated in accordance with the general production instructions described above, using the following experimental steps:
1. 20 ml of a 50% by weight mixture of geraniol in ethanol was applied to 35 g of $SiO_2$ (Sipernat® 820A).
2. The loaded particles were dried in a vacuum drying cabinet at 35° C. for 24 hours.
3. 20 ml of a 50% by weight solution of PEG 10000 in $H_2O$ were applied.
4. The loaded particles were dried in a vacuum drying cabinet at 35° C. for 24 hours.
5.-6. Items 3 and 4 were repeated.
7. The microcapsules were subsequently washed with an organic solvent (e.g. ethanol, cyclohexane), filtered and dried as described in 4.

Example 2

Menthol was encapsulated in accordance with the general production instructions described above, using the following experimental steps:
1. 10 g of menthol were applied at 50° C. from the melt to 35 g of $SiO_2$.
2. The loaded particles were subsequently cooled to room temperature.
3. 20 ml of a 50% by weight solution of PEG 10000 in $H_2O$ were applied.
4. The loaded particles were dried in a vacuum drying cabinet at 35° C. for 24 hours.
5.-6. Items 3 and 4 were repeated.
7. The microcapsules were subsequently washed with an organic solvent (e.g. ethanol, cyclohexane), filtered and dried as described in 4.

Example 3

Encapsulation with zinc alginate
1. 20 ml of a 2% by weight solution of sodium alginate in water were applied to the carrier-supported particles as per Example 1.1-1.2 and 2.1-2.2.
2. The loaded particles were dispersed in 250 ml of a 1% by weight ZnCl solution for one hour.
3. The particles were then isolated by filtration and dried in a vacuum drying cabinet at 50° C. for 24 hours.
4.-5. Items 2 and 3 were repeated.

Example 4

Geraniol was encapsulated in accordance with the general production instructions described above, using the following experimental steps:
1. 20 ml of a 50% by weight mixture of geraniol in ethanol was applied to 30 g of $SiO_2$ (Aeroperl 300/30®).
2. The loaded particles were dried in a vacuum drying cabinet at 35° C. for 24 hours.
3. 20 ml of a 50% by weight solution of PEG 10000 in $H_2O$ were applied.
4. The loaded particles were dried in a vacuum drying cabinet at 35° C. for 24 hours.
5.-6. Items 3 and 4 were repeated.
7. The microcapsules were subsequently washed with an organic solvent (e.g. ethanol, cyclohexane), filtered and dried as described in 4.

Example 5

The antifouling additive of the invention is compatible with conventional marine coating systems. This is exemplified by describing the production of the coating of the invention on the basis of a hybrid epoxy-siloxane system.

A base coating material is prepared by known methods from the individual components (see Table 3). In a second step, the curing agent and the antifouling additive in a concentration of 13.2% are dispersed with low shear stress (e.g. Dispermat, diameter: 80 mm, 2000 rpm) in accordance with Examples 1-4 in order to avoid excessive mechanical stress on the additives.

TABLE 3

| Substance | % by weight |
|---|---|
| SILIKOPON ® EF | 28.4 |
| Tinuvin 292 light stabiliser | 0.9 |
| TEGO ® Airex 955 deaerating agent | 0.4 |
| Kronos 231 titanium dioxide white pigment | 22.9 |
| AT extra talc filler | 1.7 |
| Butyl acetate | 13.2 |
| SILIKOPON ® EF | 28.1 |
| Antifouling additive | 13.2 |
| DYNASYLAN ® AMEO | 12.3 |

The coating material is then applied to the substrate to be coated by a conventional coating method (e.g. spraying, rolling). The substrate ought to have been prepared in accordance with the requirements of the field of application (e.g. corrosion protection primer). After 8 hours, the coating of the invention has cured and is ready for use.

Example 6

The Elasticity Behaviour of a Coating According to Example 5 with the Antifouling Additive According to Example 4 is Tested The elasticity of the coatings is determined using the Erichsen cupping test with the lacquer and paint testing machine model 202 C from Erichsen in accordance with DIN ISO 1520. Model 202 C is a bench top apparatus consisting of sheet steel housing, test cylinder, hydraulic assembly and control panel.

For the implementation of the test, the coated metal sample sheet is inserted into the test cylinder with the test area upwards, and is firmly gripped automatically. The ball punch presses against the sheet and produces deformation. As soon as a first crack appears in the coating, the advance of the ball punch is stopped by actuation of a push button. It is then possible to read off the Erichsen cupping figure, corresponding to the depth of indentation.

It was found that incorporating the antifouling additives of the invention into the coating material reduced its elasticity behaviour by less than 1%. This is a reduction which is negligible for practical purposes, and demonstrates that the antifouling additives of the invention have no adverse consequences for the mechanical properties of the coating.

Example 7

In this Example, the Abrasion Behaviour of a Coating According to Example 5 with the Antifouling Additive According to Example 4 is Tested The abrasion test is carried out using the Erichsen Standard Abrasion Tester model 305 in accordance with ASTM D4060-07. The abrasion is produced by two abrading rollers which act with a defined force (e.g. 1000 g) on the rotating sample holder. Evaluation is carried out using the weight loss method. The material under test is exposed to a number of cycles, and the proportion of the sample that has been abraded is determined by differential weighing. In this case it was found that the coating system of the invention according to Example 5 exhibits abrasion behaviour which is comparable with that of the base coating material. This confirms again that the additives of the invention have no negative effects on the mechanical properties of the antifouling coatings.

Example 8

This Example Tests Release of an Active Antifouling Additive According to Example 4

Within the liquid coating formulation, the antifouling additives of the invention ought to exhibit maximum latency, i.e. there should be very little, or no, release of active ingredient. The active ingredient is to be released only on contact with sea water. In order to test this, i.e. to analyse the latency behaviour and the release, the antifouling additives of the invention are dispersed in solvent (e.g. cyclohexane, butyl acetate, ethanol) or water. At defined intervals of time (e.g. 24 h, 1 day, 7 days, 14 days), gas chromatography (Agilent 6890N gas chromatograph) is used to determine the concentration of the active substance released.

The release analysis of the antifouling additives of the invention shows that by using a suitable envelope substance it is possible, by comparison with the unencapsulated system, to retard the diffusion-controlled release by a factor of at least 2. The studies show that, by the method described, there is both protection of the active substance within the liquid coating formulation (encapsulation, latency) and also a diffusion-controlled release on contact with water.

The invention claimed is:

1. Antifouling additive comprising
    at least one porous carrier, wherein the porous carrier is organic, inorganic, or a combination thereof,
    at least one active antifouling ingredient incorporated into the porous carrier, and
    at least one further substance, of which at least part of the total amount of the further substance present in the antifouling additive is incorporated in the pores of the porous carrier,
    wherein, as demonstrated by XPS analysis of the outermost atomic layer of the antifouling additive, at least part of the outermost surface of the antifouling additive is formed by the porous carrier, and
    wherein the further substance is a protection substance comprising a water-soluble or water-swellable polymer,
    wherein the water-soluble or water-swellable polymer is selected from the group consisting of polysaccharides, block copolymers, caprolactones, lactide and glycolide polymers, polyanhydrides, polyesters, hydroxybutyric acids, polyphosphazenes, polyphosphoesters, and combinations thereof.

2. Antifouling additive according to claim 1, wherein at least 10% of the outermost atomic layer of the antifouling additive is formed by the porous carrier.

3. Antifouling additive according to claim 1, wherein the porous carrier comprises an amorphous silicon dioxide.

4. Antifouling additive according to claim 3, wherein the amorphous silicon dioxide has an average particle size $d_{50}$ of 4 to 70 µm, or the amorphous silicon dioxide is a granulated silicon dioxide with a $d_{50}$ of 20 to 180 µm.

5. Antifouling additive according to claim 3, wherein the amorphous silicon dioxide comprises Aeroperls® having an average particle size $d_{50}$ of 4 to 70 µm.

6. Antifouling additive according to claim 3, wherein the amorphous silicon dioxide has at least one of a grindometer value of 18 to 45 µm, a tapped density of 50 to 350 g/l, an oil number of 180 to 360 g/100 g, a DBP number of 200 to 450 g/100 g, a BET of 100 to 600 m²/g, a total pore volume of 6 to 14 ml/g (0.0042-414 MPa, 140°), or a combination thereof.

7. Antifouling additive according to claim 1, wherein the weight ratio of the protection substance to active ingredient is in the range from 10:1 to 1:10.

8. Antifouling additive according to claim 1, wherein the active ingredient charge of the porous carrier is at least 10% by weight, based on the DBP absorption of the porous carrier.

9. Antifouling additive according to claim 1, wherein the protection substance charge of the porous carrier is at least 10% by weight, based on the DBP absorption of the porous carrier.

10. Antifouling additive according to claim 1, wherein the active ingredient is a biodegradable active ingredient.

11. Antifouling additive according to claim 1, wherein the antifouling additive has a free-flowability as measured using the flow funnels of DIN 53492 in the range from 1 to 4.

12. Process for producing an antifouling additive according to claim 1, the process comprising contacting at least one porous carrier with at least one active ingredient in such a way that the active ingredient is drawn into the pores of the porous carrier, and producing a protection system comprising the protection substance.

13. Process according to claim 12, wherein suitable washing operations, inhibiting steps, or a combination thereof ensure that there is no active ingredient on the outer surface of the antifouling additive.

14. Process according to claim 12, comprising the following steps:
   a) introducing at least one porous carrier in a solids mixing unit
   d) adding at least one active ingredient to the solids mixing unit
   e) impregnating the porous carrier with active ingredient.

15. Process according to claim 14, further comprising at least one of the following steps:
   b) evacuating the solids mixing unit
   f) inhibiting the active ingredient adhering to the outer surface of the porous carrier, washing, drying, or a combination thereof.

16. Process according to claim 14, further comprising one or more of the following steps:
   c) preimpregnating the porous carrier with at least one protection substance until a maximum of 50% by weight of the DBP absorption value is reached
   g) adding at least one protection substance
   h) impregnating the porous carrier with at least one protection substance
   i) washing or drying, or a combination thereof
   j) reactively inhibiting the active ingredient adhering to the outer particle surface of the porous carrier, washing, or drying, or a combination thereof.

17. Process according to claim 6, wherein steps b), c), d) and e), steps g) and h), or a combination thereof, are repeated at least once, wherein the active ingredient of repeated steps d) and e) is identical to or different from the active ingredient of steps d) and e), or wherein the protection substance of repeated steps g) and h) is identical to or different from the protection substance of steps g) and h).

18. Process according to claim 16, wherein the amount of at least one protection substance added in step g) is regulated such that the total amount of at least one active ingredient and at least one protection substance added in the production of the antifouling additive is 50% to 100% by weight of the DBP absorption value of the porous carrier.

19. Process according to claim 14, wherein the porous carrier and at least one active ingredient are mixed before being introduced into the solids mixing unit.

20. Process according to claim 14, wherein the amount of at least one protection substance added in step g) is regulated such that the total amount of at least one active ingredient and at least one protection substance added in the production of the antifouling additive is greater than the total pore volume of the porous carrier, and the excess of at least one protection substance is absorbed by addition of porous carrier, of porous carrier charged with at least one active ingredient, or a combination thereof.

21. Coating system comprising at least one antifouling additive according to claim 1.

22. Coating system according to claim 21, wherein the coating system is an eroding coating system, a coating system having an insoluble matrix, an antistick coating or a microstructured surface-coating.

23. Method of protecting a surface of an object which is in contact with water, comprising applying a coating system according to claim 21 to the surface of the object.

24. Method of claim 23, wherein the object which is in contact with water is protected against biofouling.

\* \* \* \* \*